Figure 1:
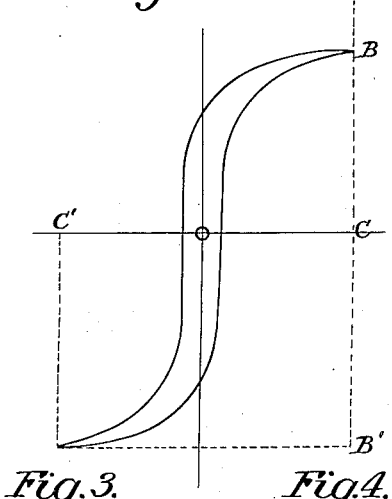
Figure 2:
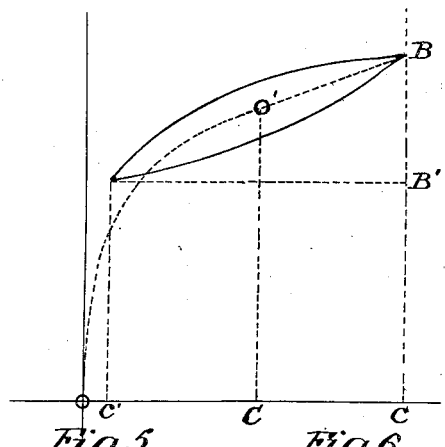
Figure 3:
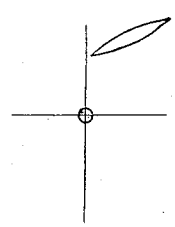
Figure 4:
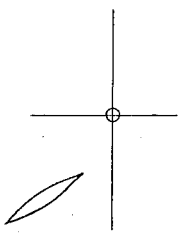
Figure 5:
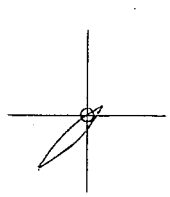
Figure 6:
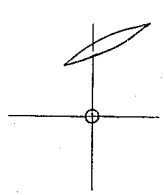

No. 743,444. PATENTED NOV. 10, 1903.
C. F. BURGESS & B. FRANKENFIELD.
MEANS FOR REGULATING SELF INDUCTANCE IN ELECTRIC CIRCUITS.
APPLICATION FILED JAN. 27, 1903.
NO MODEL. 4 SHEETS—SHEET 1.

Witnesses
Inventors
Charles F. Burgess
Budd Frankenfield
Attorneys

No. 743,444. PATENTED NOV. 10, 1903.
C. F. BURGESS & B. FRANKENFIELD.
MEANS FOR REGULATING SELF INDUCTANCE IN ELECTRIC CIRCUITS.
APPLICATION FILED JAN. 27, 1903.
NO MODEL. 4 SHEETS—SHEET 3.
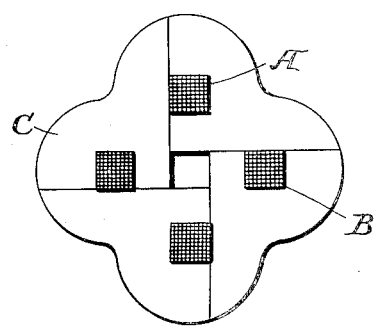
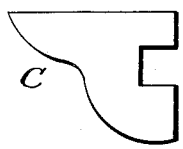
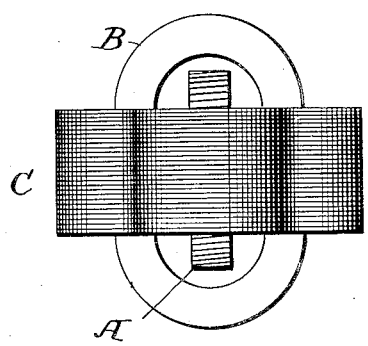
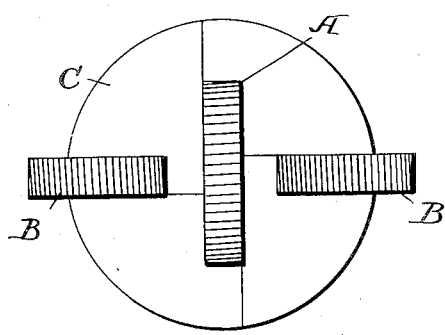
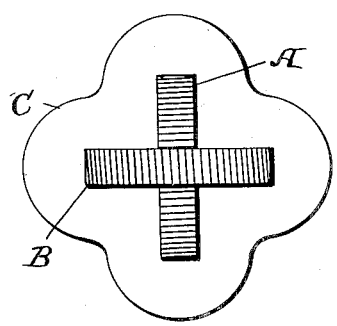
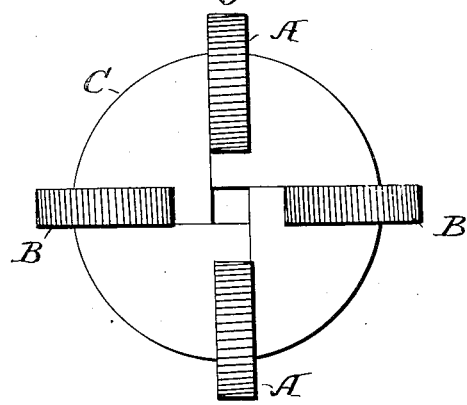
Witnesses
Inventors
Charles F. Burgess
Budd Frankenfield
By
Attorneys No. 743,444. PATENTED NOV. 10, 1903.
C. F. BURGESS & B. FRANKENFIELD.
MEANS FOR REGULATING SELF INDUCTANCE IN ELECTRIC CIRCUITS.
APPLICATION FILED JAN. 27, 1903.
NO MODEL. 4 SHEETS—SHEET 4.
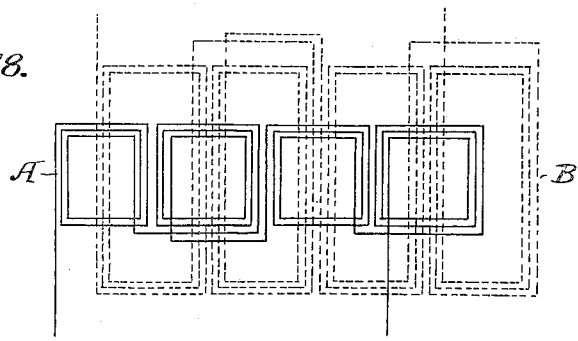
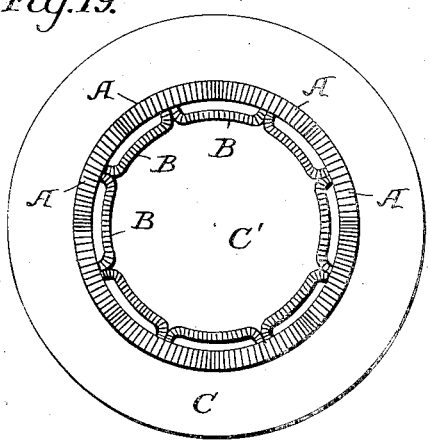
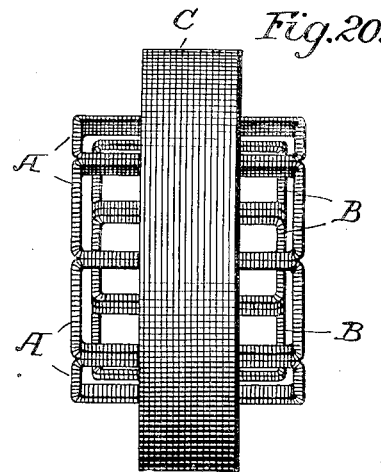
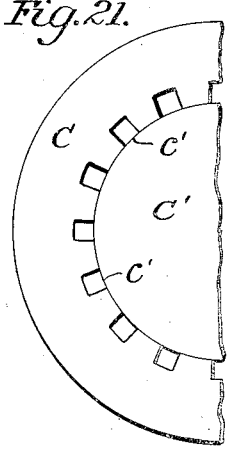
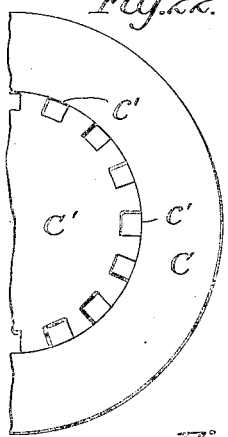
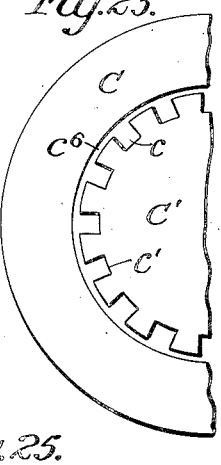
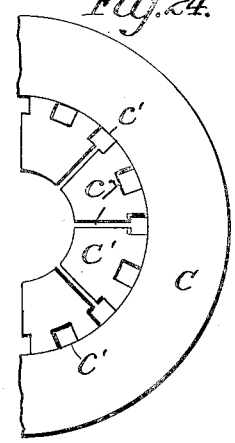
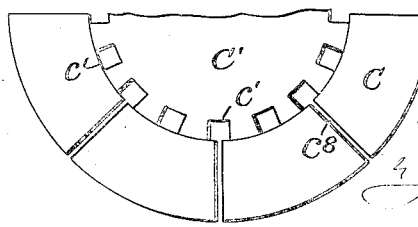

No. 743,444. Patented November 10, 1903.

UNITED STATES PATENT OFFICE.

CHARLES FREDERICK BURGESS, OF MADISON, WISCONSIN, AND BUDD FRANKENFIELD, OF PITTSBURG, PENNSYLVANIA.

MEANS FOR REGULATING SELF-INDUCTANCE IN ELECTRIC CIRCUITS.

SPECIFICATION forming part of Letters Patent No. 743,444, dated November 10, 1903.

Application filed January 27, 1903. Serial No. 140,791. (No model.)

*To all whom it may concern:*

Be it known that we, CHARLES FREDERICK BURGESS, residing at Madison, county of Dane, and State of Wisconsin, and BUDD FRANKENFIELD, residing at Pittsburg, county of Allegheny, and State of Pennsylvania, citizens of the United States, have invented certain new and useful Improvements in Means for Regulating Self-Inductance in Electric Circuits, of which the following is a specification.

Our invention relates to means for regulating the self-inductance in electric circuits carrying current, including magnetic material, in their magnet-circuits; and it has for its object to provide means for accomplishing this general result, broadly considered, whereby such means may be used in many and various relations in connection with electric circuits to produce various results therein—such, for instance, as regulation of current and pressure in alternating or varying current circuits; and to these ends our invention consists in the means having the features of construction and arrangement and mode of operation substantially as hereinafter more particularly set forth.

While the broad principle involved in our invention may be used in many and various relations, it is more particularly adapted for use in connection with electric circuits as a means for varying the inductance therein for the purpose of regulating the pressure or current thereof, and it is more especially useful in connection with alternating-current circuits, and we therefore will describe our invention generally and in connection with alternating-current circuits and as a means for regulating the same; but it is to be understood that we do not limit our invention by so doing, as we believe our invention is broadly new and that those skilled in the art can vary the embodiment of the invention so as to adapt it for many and various uses without departing from the principle thereof, the general and controlling features of which will be set forth herein.

Figure 7:
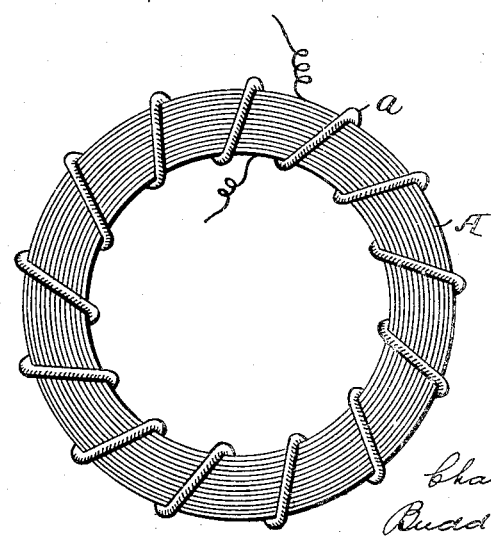
Figure 8:
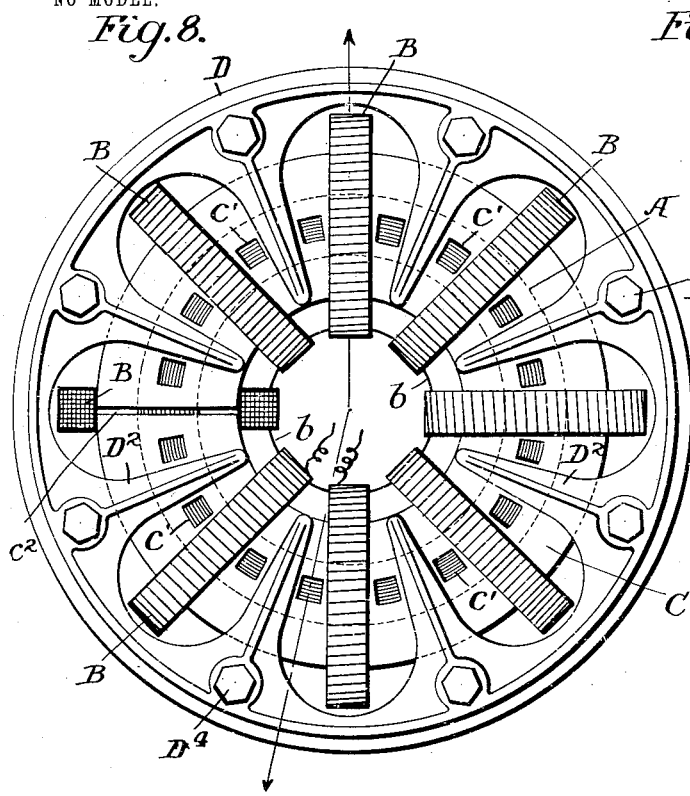
Figure 9:
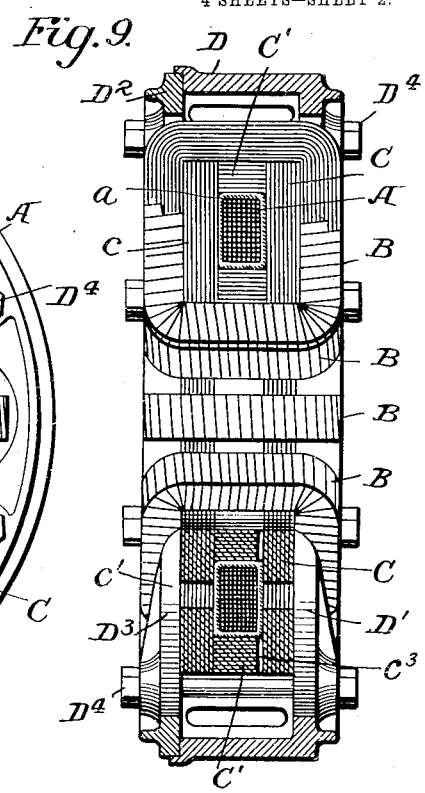
Figure 10:
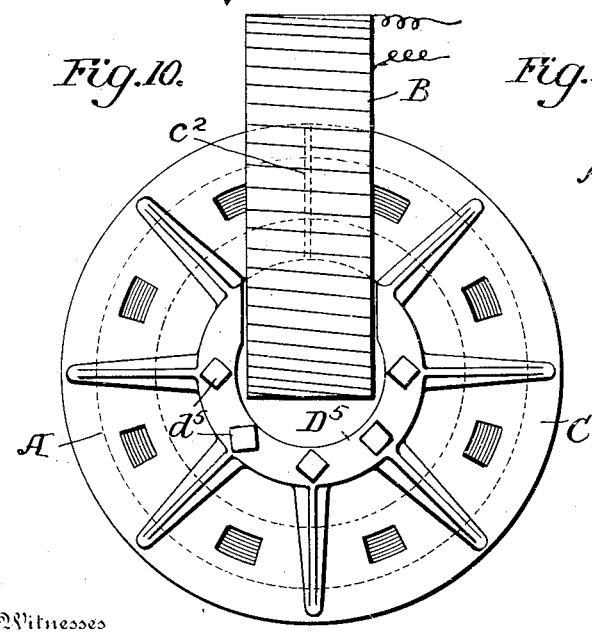
Figure 11:
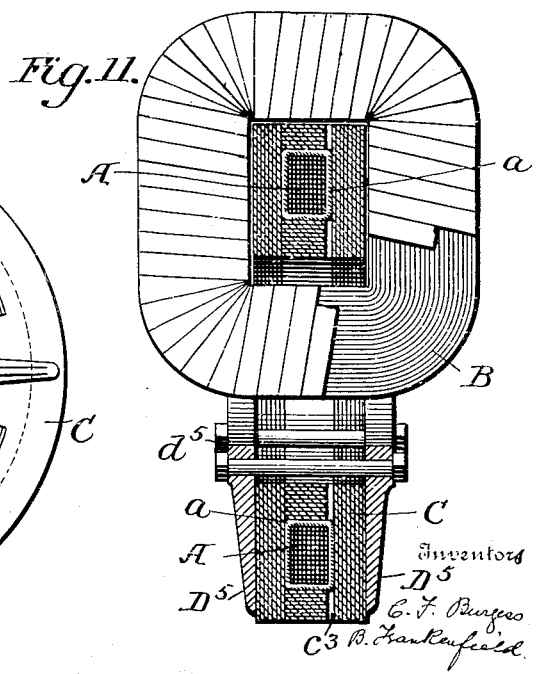

Referring to the accompanying drawings, Figures 1 to 6 are diagrammatic representations of the hysteresis loop of magnetic induction. Fig. 7 is a detail side view of one form of coil. Fig. 8 is a side view of a mechanical structure embodying our invention. Fig. 9 is a transverse section of the same. Figs. 10 and 11 are respectively side and sectional views of another embodiment of our invention. Figs. 12, 13, 14, and 15 are sectional, detail, side, and plan views of another embodiment of the invention; and Figs. 16 and 17 are plan views of other modifications. Figs. 18 to 25 are detail views of another modification.

In our Patent No. 720,884, dated February 17, 1903, we disclosed a method of regulating electric circuits by varying the inductance in the circuit, such circuit including the resultant inductance due to superposing two magnetizations on a core of magnetic material, and the resultant inductance in the circuits illustrated was due, further, to superposing an alternating-current magnetization and a direct magnetization upon the same core of magnetic material. Our present invention relates to the same general subject-matter and was disclosed to a greater or less extent in said application, but was not claimed therein, and our invention consists, further, in means for regulating the self-inductance in an electric circuit or circuits arranged in magnetic inductive relation to magnetic material and at the same time preventing mutual inductance between the regulated and the regulating circuits, whereby the advantages of our method disclosed and claimed in our former application may be secured in the most satisfactory manner.

When a piece of magnetic material is magnetized by an alternating current, the well-known hysteresis loop (shown in Fig. 1) is described during each cycle. Let O C represent the maximum instantaneous value of this current, and B B' the total change in magnetization caused by variation of the current from the maximum positive value O C to an equal and maximum negative value O C'. Now suppose that the same magnetic material is initially magnetized by a direct current to a point O', Fig. 2, on the magnetization curve, which is represented by the dotted curve O O' B. The point O' then represents an amount of magnetization C O' produced by a current O C. If an alternating current of the same value as before be used to magnetize the material in the same linear direction as the direct current, C c and C c' will represent its equal maximum instantaneous values, and the total change in magnetism caused by the variation from the maximum positive value C c to an equal maximum negative value C c' of the alternating current will be represented by the distance B B'. The same number of magnetizing turns are assumed for the alternating current in Figs. 1 and 2 and for the direct current in Fig. 2, and the magnetism is taken in the same direction and in the same plane in both figures. It will be noticed that the range of variation B B' is greater in Fig. 1 than in Fig. 2. In other words, the self-inductance for a complete cycle will be greater for the conditions represented by Fig. 1 than in Fig. 2. When the self-inductance is varied by this means, the two magnetizations being in the same plane and in the same direction, the alternating current induces in the direct-current circuit an alternating electric pressure after the manner of the action of the primary of a transformer on its secondary. In many practical applications it is desirable to avoid this transformer action, and to do so the two magnetizing-coils must be so placed that their mutual inductance is zero. It is furthermore necessary that the variation of magnetism represented by the distances B B' in Figs. 1 and 2 be regulable by change of the direct magnetization with this arrangement of the coils.

We have discovered that when the magnetic core is subjected to magnetization by a direct current, which magnetization is at right angles to the magnetization due to an alternating current, the range of magnetization is reduced as before, and its value is regulable by a change in value of the direct current. It is well known that two magnetizing-coils may be arranged to produce magnetizations at right angles to each other in the same magnetic material with a mutual inductance of zero between the coils, and it follows theoretically as well as practically a most efficient means for producing these results consists, broadly speaking, in a magnetic core having two independent electric circuits arranged in magnetic inductive relations thereto and in the non-inductive relations to each other, or, in other words, the two independent electric circuits are arranged at right angles to each other magnetically, so as to have no mutual inductance, while at the same time they are in magnetic inductive relation to the core.

The advantages of reducing or practically eliminating the mutual inductance between the two circuits in magnetic inductive relations with the core are apparent to those skilled in the art.

It is manifest that many and various structural devices may be made which will embody the principle of our invention and secure the advantages thereof to a greater or less degree, and without attempting to illustrate all the various forms or embodiments of our invention we will now proceed to describe several typical embodiments, it being understood that our invention, broadly considered, is not limited to the specific structures set forth.

In Figs. 7, 8, and 9 we have illustrated an embodiment of our invention, in which A represents a coil of insulated wire in the form of a ring, and this coil is bound or surrounded by some insulating material, (shown in the present instance as the cord $a$,) and this constitutes one of the elements of our apparatus and is shown as adapted to carry alternating currents and will be referred to as the "alternating-current" coil or circuit. In these figures the direct-current coil or coils B are made in any suitable way and are adapted to thread or link the alternating current coil A, and in this instance we have shown a number of direct-current coils B, connected together in series by the conductor $b$. The core of magnetic material C in this instance is made up of a number of plates or laminæ $c$, which are arranged on either side of the alternating-current coil A and are preferably provided with ventilators $c'$, while the space between the adjacent faces of the side groups of laminated plates on each side of the alternating coil is filled with rings, thin cylinders, or laminations C', the laminations being transverse to the alternating coil A, while the laminations $c$ are in planes parallel to the face of the alternating coil. The direct-current coils in the present instance are of such a shape as to fit the core C, made up in the manner above described. In order to hold the laminæ together, we provide a support or clamp of non-magnetic material, shown in the present instance as composed of a ring D, having on one side inward extensions D', and an annular plate D², also having inward extensions D³, and the parts may be secured together in any desired way, as by means of bolts D⁴. In this way a very compact and effective device can be made, and it will be seen that the direct-current coils B are arranged so that their common magnetic circuit crosses that of alternating-current coil A practically at right angles and that the mutual inductance between the coils is eliminated. The core being made of laminations is cheap and effective and provides, through the medium of the windows or openings, sufficient ventilation, and they are arranged so as to form an air-gap $c^2$, which is advantageous or necessary to prevent induced currents in the iron. It will thus be seen that the device comprises several elements, as an alternating-current coil, one or more direct-current coils, a core of magnetic material surrounding the alternating-current coil and surrounded by the direct-current coil or coils, and a suitable clamp or frame to hold the parts together.

In Figs. 10 and 11 another embodiment of our invention is shown, and in this case the alternating-current coil A is arranged substantially as before stated and is bound with a cord $a$ and surrounded by the core C, made up substantially as before described, except that in this instance another air-gap $c^3$ is arranged between the transverse laminations and the flat laminations, so as to adapt the device for regulating a circuit for constant current. This gap may be so proportioned that the alternating current when the apparatus is the only thing in circuit with the generator will just equal in value the value of the constant current. In this embodiment there is a single direct-current coil B, which is wound in any desirable manner and which links the alternating-current coil and the magnetic core in the manner clearly shown, and the frame or clamp $D^5$ consists, essentially, of two spider frames secured by bolts $d^5$ or otherwise and arranged in the opening of the alternating-current coil, with the fingers projecting outward. By the term "link" used herein in connection with lines of force is understood to be meant the circuiting of the lines of force through the coil and completing themselves outside in the same manner as the link of a common chain circuits another link.

While in the two forms of embodiments so far described we have described the coil A as the alternating-current coil and have surrounded this by the direct-current coil or coils, it is to be understood that the inner coil could be used as a direct-current coil and the outer or surrounding coil as the alternating coil. In either case the core of magnetic material can be the same as that heretofore described; but the air-gap for preventing induced currents in the core will in the latter case be located so as to break the continuity of the metal in the magnetic circuit about the coil A. The gap $c^3$, Fig. 11, would serve this purpose, the coil B in this case serving as the alternating-current coil. If used for a constant current, the radial air-gap $c^2$, Fig. 10, could then be so proportioned as to maintain the current at the required value when the apparatus only is in circuit with a source of constant pressure and frequency.

In Figs. 12, 13, 14, and 15 we have illustrated another construction embodying our invention, in which A represents the alternating-current coil, and B the direct-current coil, arranged at right-angles to each other, and surrounding these coils is core C, of magnetic material. This core can be made up of a series of stampings, (shown in detail in Fig. 13,) so that practically there is but one form of stamping to make up the whole core. In Figs. 16 and 17 is shown another embodiment where the parts are lettered as before, but in which there are two direct-current coils B, arranged at right angles to the alternating-current coil or coils A, and the core C is made up of sectional stampings, as indicated.

Still another modification of our invention is shown in Figs. 18 to 25, inclusive. In this construction there is shown a plurality of alternating-current coils A and a plurality of direct-current coils B, so placed that the lines of force set up by the alternating-current coils do not link any of the direct-current coils and so that the lines of force set up by the direct-current coils do not link any of the alternating-current coils—in other words, so that the mutual inductance is zero. The magnetic circuits are in the same plane with regard to the core, and this plane is parallel to the direction of the laminations. The core consists of two stampings, as an outer ring C, fitting circumferentially an inner disk $C'$, and appropriate openings $c'$, Figs. 21, 22, 23, 24, and 25, are provided either in the ring or in the disk for the coils. In this construction the coils of the alternating-current and the direct-current circuits overlap and are connected in series, as indicated in Fig. 18, but they do not link. In this figure the full line A represents the alternating-current circuit and the dotted lines B the direct-current circuit. The coils consist of one or more turns of insulated conductor and are placed ninety degrees apart magnetically, so that the mutual inductance between the circuits is zero. The core, as before, is laminated and made of two punchings, and either the ring portion C or the disk portion $C'$ may be provided with notches, as indicated in Figs. 21, 22, respectively, and the coils or windings are placed in the notches of the core, and each notch contains parts of two coils of the same circuit, alternating notches being used for the different circuits, as shown in Figs. 18 and 19. The device may be provided with a circumferential or annular air-gap $c^6$, Fig. 23, for adaptation of the device for constant-current working, or radial air-gaps $c^7$ $c^8$ may be formed in the stampings and so placed that the air-gap inductance is in the alternating magnetic circuits only. In the structure thus described there may be any appropriate clamping device for holding the laminations, which need not be described.

While we have spoken of certain coils as being "alternating-circuit" coils and others as "direct-circuit" coils, it is evident that either set of coils may be used for either purpose.

These illustrations are sufficient to define the general character of devices embodying our invention, and we may refer to our former application as embodying some other forms or embodiments of the invention.

Our invention may be utilized, as indicated, for many and various purposes, and several ways of utilizing it and accomplishing the regulation of the regulated circuit by changing the current in the other other circuit are shown in our application for regulating electric circuits, above referred to.

It will be evident from the above that in order to obtain the most perfect results and most thoroughly eliminate all mutual inductance between the respective circuits the coils of the respective circuits should be arranged at right angles magnetically to each other and in such a way that the lines of force set up by one coil will not link, thread, or pass through the turns of the other coil, and any such arrangement of the coils at less than a right angle to each other magnetically will be less effective in eliminating the mutual inductance, but may eliminate it to a greater or less extent. It is also manifest from the above that a single alternating-current coil or a plurality thereof or a single direct-current coil or plurality thereof may be used, according to the exigencies of any particular case, and in our claims where we use the term "coil" it is to be understood that it embraces a single coil or a plurality of coils. It is further to be understood that while we have defined one coil as an "alternating-current" coil and another as a "direct-current" coil either coil may be supplied either with direct current, alternating current, or varying current, according to the particular application to which the invention is made. It is further to be understood that in referring to the elimination of mutual inductance we do not confine ourselves necessarily to absolute elimination, but rather to minimization of mutual inductance to such an extent that it will not be a disadvantage in the operation for any particular purpose. In other words, the placing of the coils so that they would be not quite but almost at magnetic right angles would be included in this specification and claims.

Where we speak of a "coil" in the specification and claims we mean either a single coil or a multiplicity of coils consisting of turns of wire or conducting material.

It will be understood that the electric current in the circuit in which we regulate the self-inductance may be direct, alternating, pulsating, or irregular, and the same may be said of the electric current in the regulating-circuit. It will be further understood that where herein it is stated that the current in one circuit may be varied "at will," by this term it is meant that the current may be varied to produce the desired results, whether it be done by hand or by automatic devices.

What we claim is—

1. As a means for regulating self-inductance in electric circuits, a core of magnetic material, and two independent electric circuits in magnetic inductive relation to the core and in non-inductive relation to each other, the current in one circuit being varied at will.

2. As a means for regulating self-inductance in electric circuits, a core of magnetic material, and two independent electric circuits in magnetic inductive relation to the core and in non-inductive relation to each other, one of the independent electric circuits carrying alternating currents, the current in one circuit being varied at will.

3. As a means for regulating self-inductance in electric circuits, a core of magnetic material, an electric circuit including a coil in magnetic inductive relation to the core, and another electric circuit including a coil also in magnetic inductive relation to the core and in non-inductive relation to the coils of the first circuit, the current in one circuit being varied at will.

4. As a means for regulating self-inductance in electric circuits, a core of magnetic material, and two independent electric circuits in magnetic inductive relation to said core and in non-inductive relation to each other, the magnetization of one circuit being in a plane at right angles magnetically to the other, and the current in one circuit being varied at will.

5. As a means for regulating self-inductance in electric circuits, a core of magnetic material, and two independent electric circuits in magnetic inductive relation to said core and in non-inductive relation to each other, the magnetization of one circuit being in the same plane but at right angles magnetically to the other, and the current in one circuit being varied at will.

6. As a means for regulating self-inductance in electric circuits, a core of magnetic material, and two independent magnetizing-coils in magnetic inductive relation to said core and arranged in a manner that the lines of force set up by one coil will not link the turns of the other coil, the current in one circuit being varied at will.

7. As a means for regulating self-inductance in electric circuits, a core of magnetic material, and two independent electric circuits in magnetic inductive relation thereto and in non-inductive relation to each other, one of which is an alternating-current circuit and the other a direct-current circuit, the direct current being varied at will.

8. A means for regulating self-inductance in an electric circuit, comprising two magnetizing-coils, one of the coils carrying alternating currents and the other direct currents, a core of magnetic material interposed between the coils, and a frame supporting the same.

9. A means for regulating self-inductance in an electric circuit, comprising a magnetizing-coil carrying alternating currents, a laminated core of magnetic material surrounding said coil and provided with ventilating-openings, a series of magnetizing-coils carrying direct currents surrounding the core, and a frame supporting the same, substantially as described.

10. A means for regulating self-inductance in electric circuits, comprising a coil, a core surrounding the same and provided with an air-gap, and another coil surrounding the core.

11. A means for regulating the self-inductance of a coil carrying an alternating or varying electric current and including magnetic material in its magnetic circuit by independent magnetization of the same magnetic material by another coil carrying an electric current (which may be direct, alternating or varying) and so placed with relation to the first coil and the magnetic material that there is no mutual inductance between the two coils.

12. A means for regulating the self-inductance of a coil carrying an alternating or varying electric current and including magnetic material in its magnetic circuit by independent magnetization of the same magnetic material by another coil carrying an electric current (which may be direct, alternating or varying) and so placed with relation to the first coil and the magnetic material that the lines of force of either coil do not link the other coil.

In testimony whereof we have signed our names to this specification in the presence of two subscribing witnesses.

CHARLES FREDERICK BURGESS.
BUDD FRANKENFIELD.

Witnesses to signature of Charles Frederick Burgess:
W. D. HIESTAND,
FANNIE G. SANFORD.

Witnesses to signature of Budd Frankenfield:
H. A. CROOKS,
THOS. T. THOMAS.